United States Patent Office 3,532,735
Patented Oct. 6, 1970

3,532,735
PREPARATION OF METHYLENEBISIMINODI-ACETONITRILE
Charles R. Morgan, Silver Spring, Md., assignor to W. R. Grace & Co., New York, N.Y., a corporation of Connecticut
No Drawing. Continuation-in-part of application Ser. No. 616,166, Feb. 15, 1967. This application Oct. 7, 1968, Ser. No. 765,682
Int. Cl. C07c 121/42
U.S. Cl. 260—465.5
9 Claims

ABSTRACT OF THE DISCLOSURE

This invention is directed to a process for preparing methylenebisiminodiacetonitrile comprising reacting iminodiacetonitrile with aqueous formaldehyde at a pH of about 0–3.

CROSS REFERENCE TO RELATED APPLICATION

This is a continuation-in-part of my copending application Ser. No. 616,166, filed Feb. 15, 1967 and now abandoned.

BACKGROUND OF THE INVENTION

This invention is directed to the preparation of methylenebisiminodiacetonitrile (MBIDAN) by reacting iminodiacetonitrile (IDAN) with aqueous formaldehyde at a pH of about 0–3.

Prior art methods for preparing MBIDAN are taught by German Pat. 1,159,959, British Pat. 974,787, and by H. W. Rinehart, J. Am. Chem. Soc. 1926, 48, 2794–2798. The two patents teach the preparation of MBIDAN from hexamethylenetetramine and HCN, and the Rinehart article teaches the preparation of crude MBIDAN by reacting formalin and IDAN under essentially neutral reaction conditions—Rinehart's crude MBIDAN product being purified by repeated crystallization from acetone.

SUMMARY OF THE INVENTION

In summary, this invention is directed to an improvement in a process for preparing MBIDAN by reacting IDAN and formaldehyde, the improvement comprising:

(a) forming a reaction mixture having a pH of about 0–3 and consisting essentially of water, IDAN, formaldehyde, and a strong acid, the mole ratio of formaldehyde:IDAN being about 1:0.1–2.5, the weight ratio of IDAN:water being about 1:0.5–20, the strong acid being present in an amount to adjust the pH of the reaction mixture to about 0–3, by admixing water, IDAN, formaldehyde, and a strong acid. (In some instances, e.g., where using a dilute aqueous formaldehyde solution all or substantially all of the water can be added as formaldehyde solution.)

(b) forming crude MBIDAN and a mother liquor having a pH of about 0–3 and consisting essentially of dissolved MBIDAN, water, and strong acid by maintaining the reaction mixture at about 0–100° C. for about 1–100 (preferably 5–50) minutes. (It is readily apparent that unreacted IDAN or unreacted formaldehyde can also be present in the mother liquor, e.g., if an excess of IDAN or an excess of HCHO over that required by the stoichiometry of the reaction is added where preparing the reaction mixture.)

(c) separating the crude MBIDAN product from the mother liquor (preferably by adjusting the temperature of the mixture of MBIDAN and mother liquor to about 5–30° C., preferably about 10–25° C. (if said mixture is not already within this temperature range) and filtering, centrifuging, or decanting; and (d) recovering the separated MBIDAN.

DESCRIPTION OF THE PREFERRED EMBODIMENTS

In a preferred embodiment ("Embodiment A") of the process described in the above summary the separated MBIDAN is washed with water (preferably at about 0–30° C.) until the MBIDAN is substantially free of strong acid.

In an especially preferred embodiment ("Embodiment B") of the process set forth in Embodiment A, supra, the washed MBIDAN is dried until it (the washed MBIDAN) is substantially free of moisture, the melting point of the thus dried MBIDAN being about 84–86° C.

In other preferred embodiments of the process described in the above summary:

(1) The mole ratio of formaldehyde:IDAN is about 1:0.2–2;

(2) The pH of the reaction mixture and the mother liquor is about 0.3–2.5;

(3) The weight ratio of IDAN to water is about 1:1–10; and (4) The reaction mixture is maintained at about 0–100° C. (more preferably at about 20–50° C.) for about 5–50 minutes.

DETAILED DESCRIPTION OF THE INVENTION

It is known that IDAN and formalin (aqueous formaldehyde) can be reacted under essentially neutral reaction conditions to obtain MBIDAN. Such a procedure is time consuming and inefficient in that very substantial reaction periods (e.g., 24 hours) are required to obtain significant yields of the desired product, and to obtain a substantial pure MBIDAN product (e.g., a product melting at about 84–86° C.) by such process it is necessary to purify the crude product by successive recrystallization from a solvent such as acetone.

It is therefore an object of the present invention to provide an improved method for producing MBIDAN.

It is another object to provide a method by which large yields of MBIDAN may be quickly and efficiently obtained from IDAN and formaldehyde.

It is another object of this invention to provide a method of preparing MBIDAN from IDAN and formaldehyde, the thus prepared MBIDAN being substantially pure (i.e., melting within the range of about 84–86° C.) without being recrystallized from any solvent.

These and still further objects of the present invention will become readily apparent to those skilled in the art from the following detailed description and specific examples.

Broadly, my present invention comprises reacting IDAN and aqueous formaldehyde under strongly acid reaction conditions at a temperature of from about 0 to about 100° C. to obtain MBIDAN.

More specifically, I have found that substantial yields of MBIDAN can be obtained if IDAN and aqueous formaldehyde are reacted in the presence of a strong acid, said acid being present in an amount to keep the pH of the reaction mixture and the reaction product (MBIDAN plus mother liquor) within the range of about 0–3 (preferably about 0.3–2.5).

The reaction which is believed to occur in the process of my invention can be represented by the following equation.

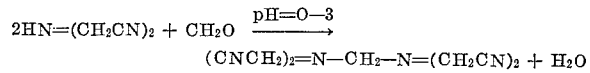

The IDAN used in the present invention can be IDAN of commerce. IDAN excellently adapted for use in the process of this invention can be typically obtained by reacting the amounts of ammonia, formaldehyde and hydrocyanic acid necessary to obtain the desired IDAN product under MBIDAN-forming conditions.

The formaldehyde used in the preparation of the MBIDAN can conveniently be commercial formaldehyde which is generally obtained as about a 37% aqueous solution. Alternatively, formaldehyde which is obtained from other sources such as the pyrolysis of paraformaldehyde, trioxane and other oxymethylene polymers can also be used. Excellent results have been obtained with aqueous formaldehyde solutions analyzing about 20–50% HCHO; however, more dilute formaldehyde solutions can be used with excellent results.

Ideally, it is found that a ratio of two moles of IDAN per mole of formaldehyde will give preferred results. It has also been found that an excess of either reactant over the amount of such reactant required by the stoichiometry of the reaction, preferably an excess of the formaldehyde reactant because it is cheaper, will also give excellent results including very substantial yields of the desired product—said product being MBIDAN of high quality which on washing with water at about 5–30° C. (preferably about 10–25° C.) and drying has a melting point of about 84–86° C. without being recrystallized from any solvent.

The present invention is conducted in an acidic aqueous medium. The acidic medium preferably is rendered acid by a strong acid such as sulfuric acid, nitric acid, hydrochloric acid, chloroacetic acid, dichloroacetic acid, trichloroacetic acid, phosphoric acid, phosphorous acid, pyrophosphoric acid, malonic acid, o-nitrobenzoic acid, and the like. I have found that, for the purpose of the instant invention, substantially any acid having a dissociation constant of at least about $1 \times 10^{-3}$ (i.e.—log dissociation constant is less than about 3) is a strong acid. The amount of acid present can be sufficient to provide a pH within the range of 0 to +3 (preferably about 0.3–2.5.

The present invention can be conveniently conducted at room temperature, i.e., about 20–25° C. and if desired, temperatures as high as 100° C. or higher or as low as 0° C. can be utilized. At temperatures in excess of about 100° C. equipment suitable for coping with elevated pressures is required. Using the general temperatures indicated above, the present reaction is found to be completed in as little as 1 minute or less. As a mater of fact, it has been found that the desired reaction occurs substantially immediately upon combining the desired reactants. However, to insure complete reaction, reaction times (the period at which the reaction mixture is held at the reaction temperature before separating the MBIDAN product) of about 5 to about 300 minutes are generally preferred.

The MBIDAN product precipitates during the course of the reaction or when the reacted mixture is cooled (e.g., to ca. 5–30° C.) and can be readily removed by a simple decantation, or filtration, or centrifugation technique. It has been found that the present reaction method can produce conversions of MBDIAN substantially in exces of 70% of theory based on the amount of IDAN present (where using excess or stoichiometric quantities of formaldehyde).

The present invention can be conveniently carried out in a batchwise or in a continuous manner. When a continuous reaction procedure is contemplated, the reaction components are admixed and conducted through a reaction zone maintained at the desired temperature. Subsequent to passing through the reaction zone the MBIDAN which precipitates can be continuously removed by filtration, decantation, or centrifugation. The reaction media can be then recycled along with makeup IDAN and formaldehyde reactants (and with makeup acid and water as required) through the reaction procedure.

Where conducting the process of my invention substantially above about 40–50° C., a substantial proportion (or all) of the MBIDAN product is generally dissolved in the acidic mother liquor. Such MBIDAN product can be readily separated from the mother liquor by cooling the mixture of MBIDAN product and mother liquor to about 5–30° C. (preferably 10–25° C.), thereby to precipitate (crystallize) the MBIDAN from the mother liquor. The thus precipitated MBIDAN can be separated from the mother liquor by centrifugation, decantation, or filtration.

Crude MBIDAN separated from the mother liquor is contaminated with substantial quantities of said liquor. I prefer to wash the crude MBIDAN with water at about 5–30° C. (preferably about 10–25° C.) until it is substantially pure (i.e., until a washed sample, after drying until substantially dry, i.e., until it is substantially free of moisture has a melting point of about 84–86° C.) before recovering it. However, if desired, unwashed, separated, MBIDAN can be recovered.

If the solid crude MBIDAN is present as large chunks or lumps I prefer to crush the lumps into small particles (e.g., particles ca. 1–5 or 2–3 millimeters, or slightly smaller, in cross section) before washing the crude MBIDAN.

While the washed MBIDAN can be recovered without drying, I prefer to dry it (suitably at about 5–760 millimeters of mercury absolute pressure at about 15–65° C. and preferably at about 5–760 millimeters of mercury absolute pressure and about 25–60° C.) until it (the washed MBIDAN) is substantially free of moisture.

Having described the basic embodiments of the present invention, the following examples are given to illustrate specific practices thereof.

Example I

A 108 g. sample of IDAN was dissolved in 2 liters of water. This solution of IDAN was added dropwise over a 1½ hour period to a stirred solution which comprised 64.8 g. standard 37% formaldehyde solution in which one ml. of sulfuric acid had been dissolved to give a pH of 0.5. When approximately ½ of the IDAN solution had been added, a white precipitate of MBIDAN started to form. The reaction mixture was maintained at a temperature of about 25–30° C. during addition of the IDAN. Subsequent to the addition of the IDAN an additional one ml. of sulfuric acid was added and the mixture was agitated for about an hour at about 25–30° C. (The pH of the thus treated mixture was 1.4.) The MBIDAN product was then removed by filtration, washed thoroughly with water and dried under reduced pressure. 81.5 g. of MBIDAN having a melting point of 85–86.5° C. was obtained. This was a conversion of 71% of theory.

Example II

IDAN (19 g.) was disolved in 350 ml. of water. To this solution was added 2.9 g. of sulfuric acid to give a pH of 1.4 and then, while stirring the resulting acidic IDAN solution and while maintaining it at about 25° C., 8.2 g. of 37% aqueous formaldehyde was added all at once. A white precipitate of MBIDAN formed instantly. The mixture was stirred an additional 30 minutes (at about 25° C.) and then filtered to remove the MBIDAN product which was washed throughly with water and dried under reduced pressure. 13.3 g. of MBIDAN (M.P. 84–86° C.) was recovered. Conversion was 66% of theory.

Example III

The procedure of Example II was repeated but acidification was effected with 2.9 g. of nitric acid (pH 1.4) whereupon 13.8 g. (68.4% conversion) MBIDAN, M.P. 84–85° C., was obtained.

Example IV

The procedure of Example II was repeated but acidification was effected with 2.9 g. of hydrochloric acid (pH 1.4) whereupon 14 g. (69.3% conversion) of MBIDAN, M.P. 84–85° C., was obtained.

Example V

The procedure of Example II was repeated but the formaldehyde was added over a 5 minute period, whereupon 14.5 g. of MBIDAN (71.8% conversion), M.P. 84.8–85.8° C., was obtained.

Example VI

IDAN (19 g.) was dissolved in 200 ml. of water with heating and stirring. The temperature was raised to 50° C. and 2.9 g. of sulfuric acid was added to give a pH of 1.2. Formaldehyde (8.2 g., 37% aqueous solution) was added all at once and a white precipitate of MBIDAN formed immediately. The temperature was maintained at 50° C. for an additional 5 minutes, then the mixture (mother liquor plus MBIDAN product) was cooled rapidly to room temperature. The product MBIDAN was recovered by filtration, washed thoroughly with water, and then dried under reduced pressure to give 16.5 g. of MBIDAN (81.7% conversion), M.P. 84–85° C.

Example VII

The general procedure of Example VI was repeated; however, in this instance, the reaction temperature was about 95° C. and the product MBIDAN was dissolved in the acidic mother liquor.

The mixture of MBIDAN and mother liquor was cooled to about 25° C., whereby solid MBIDAN precipitated. The solid MBIDAN was separated from the cooled mother liquor by filtration. The separated MBIDAN was washed with water at about 25° C., dried under reduced pressure at about 60° C. and recovered. The conversion was 80% of theory. The washed and dried MBIDAN product melted at 84–85° C.

The above examples clearly indicate that substantial yields of MBIDAN can be obtained by the practice of the invention disclosed herein.

MBIDAN prepared according to the process of this invention has been used with excellent results to alkylate phenols. For example, p-cresol (a phenol) has been alkylated with at least one —$CH_2N=(CH_2CN)_2$ group by reacting the phenol with MBIDAN under substantially anhydrous conditions in the presence of a substantially non-oxidizing strong acid to form a salt of the acid and the alkylated phenol (p-cresol) and iminodiacetonitrile according to the reactions represented by the following equation:

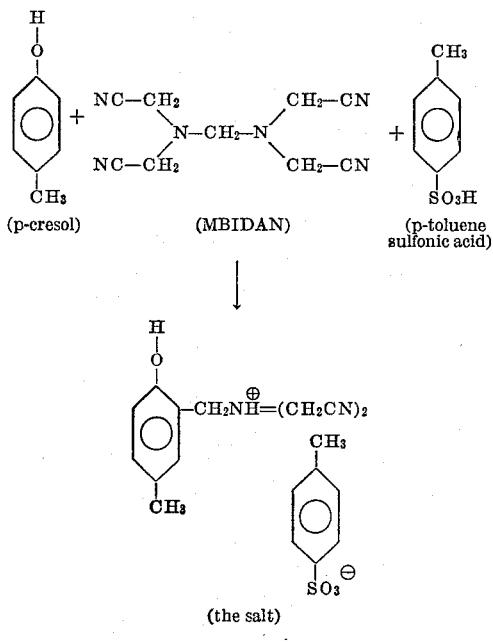

The salt was hydrolyzed with sodium hydrogen carbonate solution to form the free alkylated phenol

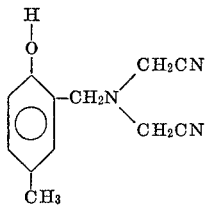

plus the sodium salt of p-toluene sulfonic acid.

The free alkylated phenol was then hydrolyzed by boiling with sodium hydroxide solution, until the evolution of ammonia ceased, to form a sodium salt of the alkylated phenol having the formula:

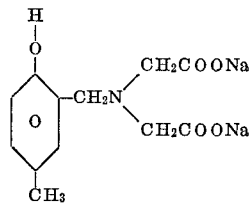

which was an excellent chelating agent for metallic ions including iron(II) and iron(III) ions. These chelates and iron and trace metal chelates formed from a half acid (said half acid being formed by treating said sodium salt with about 0.5 mole of sulfuric acid per mole of salt) having the formula

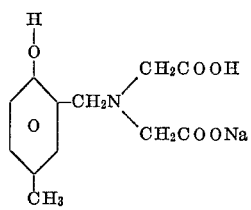

are excellent additives for adding iron and trace metals to soil—especially to alkaline and calcareous soils—the iron or trace metals being slowly released in the soils.

The salt and the half acid of the alkylated phenol are also excellent materials for removing brown stains caused by iron compounds from sinks, cloth, floors, and the like.

As used herein the term "percent (%)" means parts per hundred by weight unless otherwise defined where used; however, as is well known to those skilled in the art, "percent yield" and "percent conversion" are dimensionless numbers. As used herein the term "parts" means parts by weight unless otherwise defined where used.

As used herein the term "substantially free of moisture" means containing less than about 2% moisture and preferably less than about 0.5–1% moisture.

As used herein the term "substantially free of strong acid" means containing less than about 0.1% strong acid and preferably less than about 0.05% strong acid.

As used herein the term "conversion" means one pass yield.

I claim:

1. In the process for preparing methylenebisiminodiacetonitrile by reacting iminodiacetonitrile with formaldehyde, the improvement comprising:
   (a) forming a recreation mixture having a pH of about 0–3 and consisting essentially of iminodiacetonitrile, formaldehyde, water, and a strong acid, the mole ratio of formaldehyde:iminodiacetonitrile being about 1:0.1–2.5, the weight ratio of iminodiacetonitrile:water being about 1:0.5–20 the strong acid being present in an amount to adjust the pH of the reaction mixture to about 0–3, by admixing water, formaldehyde, iminodiacetonitrile, and a strong acid;

(b) forming crude methylenebisiminodiacetonitrile and a mother liquor having a pH of about 0–3 and consisting essentially of dissolved methylenebisiminodiacetonitrile, water, and strong mineral acid by maintaining the reaction mixture at about 0–100° C. for about 1–100 minutes;

(c) separating the crude methylenebisiminodiacetonitrile product from the mother liquor; and (d) recovering the separated methylenebisiminodiacetonitrile.

2. The process of claim 1 in which the separated methylenebisiminodiacetonitrile is washed with water until said methylenebisiminodiacetonitrile is substantially free of strong acid.

3. The process of claim 2 in which the washed methylenebisiminodiacetonitrile is dried until substantially free of moisture.

4. The process of claim 3 in which the melting point of the dried methylenebisiminodiacetonitrile is about 84–86° C.

5. The process of claim 1 in which the mole ratio of formaldehyde:iminodiacetonitrile is about 1:0.2–2.

6. The process of claim 1 in which the pH of the reaction mixture and the mother liquor is about 0.3–2.5.

7. The process of claim 1 in which the weight ratio of iminodiacetonitrile:water is about 1:1–10.

8. The process of claim 1 in which the reaction mixture is maintained at about 0–100° C. for about 5–50 minutes.

9. The process of claim 1 in which the reaction mixture is maintained at about 20–50° C. for about 5–50 minutes.

References Cited
FOREIGN PATENTS 974,787  11/1964  Great Britain.
1,159,959  12/1963  Germany.

JOSEPH P. BRUST, Primary Examiner

U.S. Cl. X.R.

260—465, 519